US012577174B2

(12) United States Patent
Ugarte

(10) Patent No.: US 12,577,174 B2
(45) Date of Patent: Mar. 17, 2026

(54) CERAMIC MATRIX COMPOSITE COMPONENT REPAIRING AND JOINING

(71) Applicant: General Electric Company, Schenectady, NY (US)

(72) Inventor: Johnnattan Tennessee Ugarte, Loveland, OH (US)

(73) Assignee: General Electric Company, Evendale, OH (US)

( * ) Notice: Subject to any disclaimer, the term of this patent is extended or adjusted under 35 U.S.C. 154(b) by 1 day.

(21) Appl. No.: 18/428,474

(22) Filed: Jan. 31, 2024

(65) Prior Publication Data

US 2025/0243125 A1     Jul. 31, 2025

(51) Int. Cl.
| | |
|---|---|
| *C04B 35/80* | (2006.01) |
| *B32B 1/00* | (2006.01) |
| *B32B 5/12* | (2006.01) |
| *C04B 35/628* | (2006.01) |
| *C04B 35/657* | (2006.01) |
| *C04B 37/00* | (2006.01) |

(52) U.S. Cl.
CPC .............. *C04B 37/003* (2013.01); *B32B 1/00* (2013.01); *B32B 5/12* (2013.01); *C04B 35/62884* (2013.01); *C04B 35/62886* (2013.01); *C04B 35/657* (2013.01); *C04B 35/80* (2013.01); *C04B 2235/5252* (2013.01); *C04B 2235/614* (2013.01); *C04B 2235/616* (2013.01); *C04B 2237/04* (2013.01); *C04B 2237/38* (2013.01); *C04B 2237/60* (2013.01); *C04B 2237/61* (2013.01); *C04B 2237/80* (2013.01)

(58) Field of Classification Search
CPC ............. B29C 70/24; B32B 5/12; B32B 1/00; C04B 35/80
See application file for complete search history.

(56) References Cited

U.S. PATENT DOCUMENTS

| | | | | |
|---|---|---|---|---|
| 6,648,597 | B1 | 11/2003 | Widrig et al. | |
| 9,068,464 | B2 | 6/2015 | Morrison et al. | |
| 9,115,584 | B2 | 8/2015 | Roberts et al. | |
| 9,527,170 | B2 | 12/2016 | Czerner | |
| 10,287,918 | B2 | 5/2019 | Quinn et al. | |
| 10,774,648 | B2* | 9/2020 | Roberts ................ | F04D 29/324 |
| 10,800,128 | B2 | 10/2020 | Feie et al. | |
| 11,459,908 | B2 | 10/2022 | Decesare et al. | |
| 11,629,600 | B2 | 4/2023 | Nissen et al. | |
| 2003/0196305 | A1 | 10/2003 | Kebbede et al. | |
| 2005/0118392 | A1* | 6/2005 | Millard ................... | C04B 35/14 428/131 |
| 2019/0016072 | A1 | 1/2019 | Mega et al. | |
| 2019/0145270 | A1* | 5/2019 | Dunn ...................... | F01D 5/282 428/33 |
| 2019/0338660 | A1* | 11/2019 | Underwood ............ | F01D 9/041 |
| 2019/0360346 | A1* | 11/2019 | Underwood .............. | F01D 9/04 |

* cited by examiner

*Primary Examiner* — Scott W Dodds
(74) *Attorney, Agent, or Firm* — Dority & Manning, P.A.

(57) ABSTRACT

A method for joining a ceramic matrix composite (CMC) component includes placing a plurality of joining plies onto a specified area such that a respective fiber direction of each of the plurality of joining plies is off-plane to a fiber direction of one or more composite plies of the specified area. The respective fiber direction of each of the plurality of joining plies differs from the respective fiber direction of each adjacent one of the plurality of joining plies.

20 Claims, 8 Drawing Sheets

CERAMIC MATRIX COMPOSITE COMPONENT REPAIRING AND JOINING

FIELD

The present disclosure relates to ceramic matrix composite (CMC) components and repairs thereof.

BACKGROUND

Gas turbine engines feature several components manufactured with CMCs. CMCs provide high temperature capability useful in aerospace applications. Examples of CMC components include turbine blades, nozzles, and shrouds. Within a turbine engine, a nozzle is formed of a plurality of airfoils joined to bands. Typically, CMC materials include ceramic fibers embedded in a matrix material such as silicon carbide (SiC), silicon, silica, alumina, or combinations thereof. Plies of the CMC material may be placed to form a preform component that may then undergo thermal processing, such as a cure or burn-out to yield a high char residue in the preform, and subsequent chemical processing, such as melt-infiltration with silicon, to arrive at a component formed of a CMC material having a desired chemical composition.

CMC structures are subject to damage during operation. For example, CMC structures may come into contact with rigid objects and may become pierced or otherwise damaged. As another example, engine environmental conditions may lead to abrasion of the CMC structures. CMC repair products and methods for repairing CMC components are desirable.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
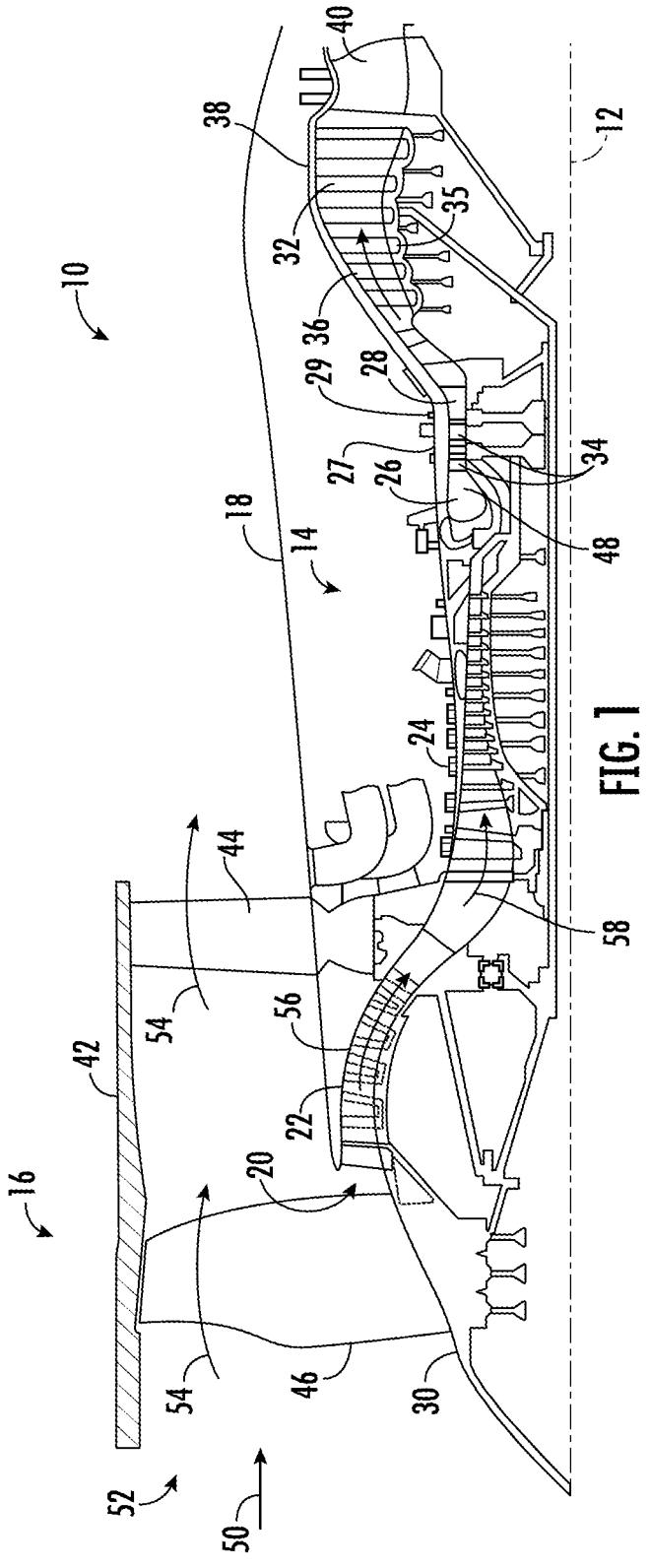
FIG. 1 is a cross-sectional view of an exemplary gas turbine engine.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The phrases "from X to Y" and "between X and Y" each refers to a range of values inclusive of the endpoints (i.e., refers to a range of values that includes both X and Y).

A "fiber direction" is an angle defined between a fiber of a ply and a reference line, such as a default axis in a two-dimensional coordinate system. The fiber direction of a first ply is "off-plane" to another fiber direction of a second ply when a difference of the angles defining the two fiber directions is nonzero.

Unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

As used herein, ceramic-matrix-composite or "CMC" refers to a class of materials that include a reinforcing material (e.g., reinforcing fibers) surrounded by a ceramic matrix phase. Generally, the reinforcing fibers provide structural integrity to the ceramic matrix. Some examples of matrix materials of CMCs can include, but are not limited to, non-oxide silicon-based materials (e.g., silicon carbide, silicon nitride, or mixtures thereof), oxide ceramics (e.g., silicon oxycarbides, silicon oxynitrides, aluminum oxide (Al2O3), silicon dioxide (SiO2), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) may also be included within the CMC matrix.ome examples of matrix materials of CMCs can include, but are not limited to, non-oxide silicon-based materials (e.g., silicon carbide, silicon nitride, or mixtures thereof), oxide ceramics (e.g., silicon oxycarbides, silicon oxynitrides, aluminum oxide (Al2O3), silicon dioxide (SiO2), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) may also be included within the CMC matrix.

Some examples of reinforcing fibers of CMCs can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide (Al2O3), silicon dioxide (SiO2), aluminosilicates such as mullite, or mixtures thereof), or mixtures thereof.

Generally, particular CMCs may be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs may be comprised of a matrix and reinforcing fibers comprising oxide-based materials such as aluminum oxide (Al2O3), silicon dioxide (SiO2), aluminosilicates, and mixtures thereof. Aluminosilicates can include crystalline materials such as mullite (3Al2O3 2SiO2), as well as glassy aluminosilicates.

In certain embodiments, the reinforcing fibers may be bundled or coated prior to inclusion within the matrix. For example, bundles of the fibers may be formed as a reinforced tape, such as a unidirectional reinforced tape. A plurality of the tapes may be placed together to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "low," "high," or their respective comparative degrees (e.g., lower, higher, where applicable) each refers to relative speeds or pressures within an engine, unless otherwise specified. For example, a "low-pressure turbine" operates at a pressure generally lower than a "high-pressure turbine." Alternatively, unless otherwise specified, the aforementioned terms may be understood in their superlative degree. For example, a "low-pressure turbine" may refer to the lowest maximum pressure turbine within a turbine section, and a "high-pressure turbine" may refer to the highest maximum pressure turbine within the turbine section. An engine of the present disclosure may also include an intermediate pressure turbine, e.g., an engine having three spools.

The present disclosure is generally related to repair and making of CMC components, such as nozzles, in a gas turbine engine. CMC materials are more frequently being used for various high temperature applications. For example, because CMC materials can withstand relatively extreme temperatures, there is particular interest in replacing components within a combustion gas flow path of a gas turbine engine with components made from CMC materials. Typically, CMC materials comprise ceramic fibers embedded in a matrix material such as silicon carbide (SiC), silicon, silica, alumina, or combinations thereof. Plies of the CMC material may be placed to form a preform component that may then undergo thermal processing, such as a cure or burn-out to yield a high char residue in the preform, and subsequent chemical processing, such as melt-infiltration with silicon, to arrive at a component formed of a CMC material having a desired chemical composition.

During operation, the CMC component may require repair as portions of the CMC component abrade away. Typically, to repair the portions, plies are folded around radii to account for changes in fiber directions of the plies. In this configuration, plies may be dropped when they do not extend in the direction of the fold, creating gaps on concave geometries. The gaps may reduce laminar organization, increasing variability of structural strength upon infiltration.

Making such portions by folding joining plies onto a repair area positions the joining plies such that the direction of fibers in the joining plies differs from the direction of fibers in other parts of the CMC component. These off-plane fiber directions of the joining plies improve laminar organization and order and create additional retention mechanisms to improve repair of the CMC component. Moreover, the differing fiber directions allow for improved infiltration into the repair area, brazes in the repair area, or green state joining for later repair operations.

Referring now to the drawings, wherein identical numerals indicate the same elements throughout the figures, FIG. 1 is a cross-sectional view of an exemplary gas turbine engine 10. The gas turbine engine 10 defines a centerline axis 12. The gas turbine engine 10 includes a turbomachine 14 and a fan section 16 positioned upstream thereof. The turbomachine 14 includes a generally tubular outer casing 18 that defines an annular inlet 20. The outer casing 18 further encloses a booster compressor 22 for raising the pressure of the air that enters the turbomachine 14.

A high pressure, multi-stage, axial-flow compressor 24 receives pressurized air from the booster compressor 22 and further increases the pressure of the air. The pressurized air flows into a combustor 26, where fuel is injected into the pressurized air stream to raise the temperature and energy level of the pressurized air. The high energy combustion products flow from the combustor 26 to a first high pressure (HP) turbine 28 for driving the high pressure compressor 24 through a first HP drive shaft, and then to a second low pressure (LP) turbine 32 for driving the booster compressor 22 and the fan section 16 through a second LP drive shaft that is coaxial with the first HP drive shaft. The HP turbine 28 includes a HP stationary nozzle 34. The LP turbine 32 includes a LP stationary nozzle 35.

A rotor disk is located downstream of the nozzles that rotates about the centerline axis 12 of the gas turbine engine 10 and carries an array of airfoil-shaped turbine blades 36. Shrouds 29, 38 having a plurality of arcuate shroud segments are arranged so as to encircle and closely surround turbine blades 27, 36 and thereby define an outer flowpath boundary along a radial direction R of the gas turbine engine 10 for a hot gas stream flowing through the turbine blades 27, 36. After driving each of the turbines 28, 32, the combustion products leave the turbomachine 14 through an exhaust nozzle 40.

The fan section 16 includes a rotatable, axial-flow fan rotor 30 and a plurality of fan rotor blades 46 that are surrounded by an annular fan casing 42. It will be appreciated that the annular fan casing 42 is supported from the turbomachine 14 by a plurality of substantially radially-extending, circumferentially-spaced outlet guide vanes 44. In this way, the fan casing 42 encloses the fan rotor 30 and the plurality of fan rotor blades 46.

From a flow standpoint, it will be appreciated that an initial air flow 50, represented by an arrow, enters the gas turbine engine 10 through an inlet 52. The air flow 50 passes through the fan rotor blades 46 and splits into a first compressed air flow 54 (represented by an arrow) that moves through the fan casing 42 and a second compressed air flow 56 (represented by an arrow) which enters the booster compressor 22. The pressure of the second compressed air flow 56 is increased and enters the HP compressor 24, as represented by the arrow 58. After mixing with fuel and being combusted in the combustor 26, combustion products 48 exit the combustor 26 and flow through the HP turbine 28. The combustion products 48 then flow through the LP turbine 32 and exit via the exhaust nozzle 40 to provide thrust for the gas turbine engine 10.

It should be appreciated, however, that the exemplary gas turbine engine 10 depicted in FIG. 1 is by way of example only, and that in other exemplary embodiments, the gas turbine engine 10 may have any other suitable configuration. For example, although the gas turbine engine 10 depicted is configured as a ducted gas turbine engine (i.e., including the fan casing 42), in other embodiments, the gas turbine engine 10 may be an unducted gas turbine engine (such that the fan is an unducted fan, and the outlet guide vanes 44 are cantilevered from the outer casing 18). Additionally, or alternatively, although the gas turbine engine 10 depicted is configured as a direct drive gas turbine engine (the fan is driven directly by the LP turbine 32) and a fixed pitch gas turbine engine (the fan rotor blades 46 are not rotatable about respective pitch axes), in other embodiments, the gas turbine engine 10 may additionally or alternatively be configured as a geared gas turbine engine (including a reduction gearbox between the such that the LP turbine 32 and the fan), as a variable pitch gas turbine engine (such that the fan includes fan rotor blades 46 that are rotatable about a pitch axis), or both. It should also be appreciated, that in still other exemplary embodiments, aspects of the present disclosure may be incorporated into any other suitable gas turbine engine. For example, in other exemplary embodiments, aspects of the present disclosure may (as appropriate) be incorporated into, e.g., a turboprop gas turbine engine, a turboshaft gas turbine engine, or a turbojet gas turbine engine.

Figure 2:
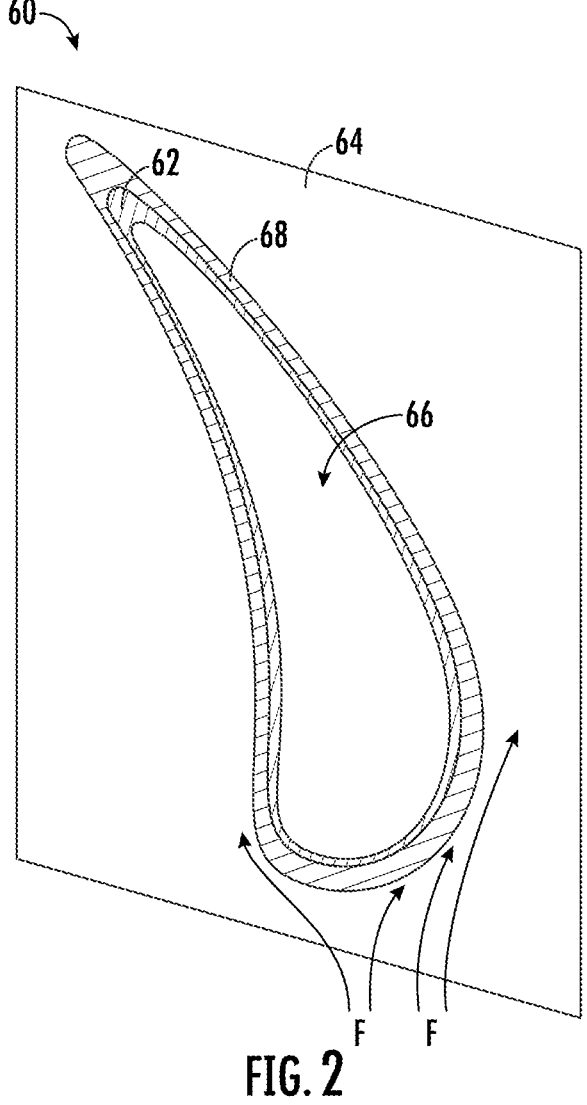
FIG. 2 is a cross-sectional view of a nozzle of the gas turbine engine of FIG. 1.

With reference to FIG. 2, a cross-sectional view of a CMC component is shown. The CMC component may be by way of one non-limiting example a nozzle 60, such as one of the HP stationary nozzle 34 or the LP stationary nozzle 35, as described above. The CMC component may be, in other non-limiting examples, a shroud, a liner, or any other suitable component that is formed of CMC materials.

The nozzle 60 includes an airfoil 62 and a band 64. In general, the nozzle 60 includes a plurality of airfoils 62 and a plurality of bands 64, one of which is shown in FIG. 2 for clarity. The airfoil 62 defines a flowpath F for air flowing past the nozzle 60. The band 64 secures the airfoil 62 to another structure of the gas turbine engine 10, providing load bearing support to the airfoil 62. The band 64 and the airfoil 62 define an opening 66 therebetween that is configured to allow a cooling medium to flow therethrough.

During operation, the nozzle 60 may receive wear from, e.g., impact with debris, high temperature exposure, etc. The portion of the nozzle 60 worn away by the debris is the "repair area" 68 of the nozzle 60, i.e., the portion of the nozzle 60 that is specified to be repaired or otherwise joined to another part of the nozzle 60. The repair area 68 may be disposed adjacent an interface where plies forming the airfoil 62 and plies forming the band 64 meet.

Now referring to FIGS. 3A-5C, the repair area 68 of the nozzle 60 and exemplary joining plies 70 are shown. The joining plies 70 are composite material plies designed to connect two or more parts of the nozzle 60. For example, a first part of the nozzle 60 may be the airfoil 62, and a second part of the nozzle 60 may be the band 64. When the joining plies 70 are used to repair CMC components such as the nozzle 60, the joining plies 70 may be referred to as "repair plies." An example of material for the joining plies 70 includes, but is not limited to, pre-preg composite plies including, for example, woven carbon fiber, binder material and coated SiC fibers. Other suitable materials for the joining plies 70 include oxides containing alumina, zirconia, titania, magnesium, silica, mullite, spinel, or combinations thereof; carbides containing silicon, boron, titanium, or combinations thereof; nitrides containing silicon, and boron. Other known fibers suitable for use in the joining plies 70 include Nextel, Nicalon, hi-Nicalon, Tyranno, and Sylramic fibers.

The plies forming the airfoil 62 have a first fiber direction 72, and the plies forming the band 64 have a second fiber direction 74 different from first fiber direction 72 of the airfoil 62. For the purposes of illustration in these FIGS., the second fiber direction 74 of the plies of the band 64 is defined to be 0 degrees, extending along an axis A. The first fiber direction 72 of the plies of the airfoil 62 of FIG. 3 is 90 degrees, extending along an axis B that is perpendicular to the axis A. That is, generally, the first fiber direction 72 of the plies of the airfoil 62 and the second fiber direction 74 of the plies of the band 64 may differ by 90 degrees. When the fiber direction 72 of the plies of the airfoil 62 differ from the fiber direction 74 of the plies of the band 64, stresses in the airfoil 62 and the band 64 are dissipated more readily. Additionally, in a form not shown in the Figures, the airfoil 62 or the band 64 may include adjacent plies that have alternating fiber directions, such as 0 degrees and then 90 degrees in a 0/90 ply stack.

A surface ply 78 may be disposed on the joining plies 70 to provide a smooth or flush surface with the airfoil 62 or the band 64, or both. Specifically, the surface ply 78 may have a fiber direction parallel or perpendicular to the fiber direction of the composite plies 76 of the repair area 68. That is, the fiber direction of the surface ply 78 may be equal to the fiber direction 72, 74 of the plies of the airfoil 62 or the plies of the band 64. In the example of FIG. 3, the fiber direction of the surface ply 78 is equal to the fiber direction 74 of the band 64. Alternatively, the fiber direction of the surface ply 78 may be chosen to meet a specified shape, geometry, or clearance to one or more adjacent components.

The joining plies 70 are placed such that a fiber direction 80 of the joining plies 70 is off-plane to the fiber direction of the composite plies 76 of the repair area 68. That is, the repair area 68 includes composite plies of the airfoil 62 or the band 64, or both, and the fiber direction 80 of the joining plies 70 is off-plane to the fiber directions 72, 74 of one or both of airfoil 62 and the band 64. In the exemplary embodiment of FIGS. 3A-3B, the fiber direction of the composite plies 76 of the repair area 68 is equal to the fiber direction 74 of the band 64, defined as 0 degrees. More specifically, the fiber direction 80 of the joining plies 70 may differ from the fiber direction of the composite plies 76 by at least 40 degrees and up to 140 degrees.

Figure 3A:
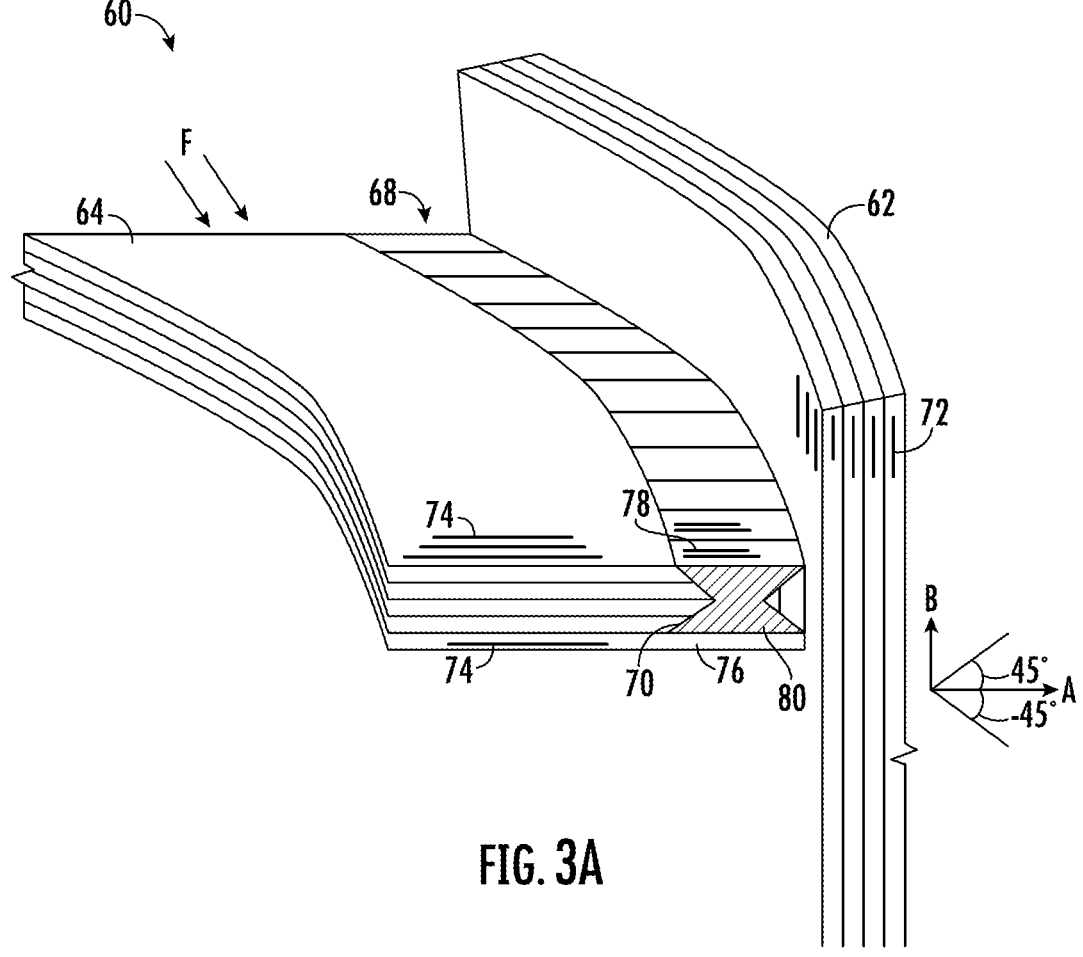
FIGS. 3A-3B are magnified views of a repair area of the nozzle of FIG. 2.

As shown in FIG. 3A, the joining plies 70 may be placed onto one of the composite plies 76 of the repair area 68. Such a configuration may result when the one of the joining plies 76 is a molded or repaired surface.

Figure 3B:
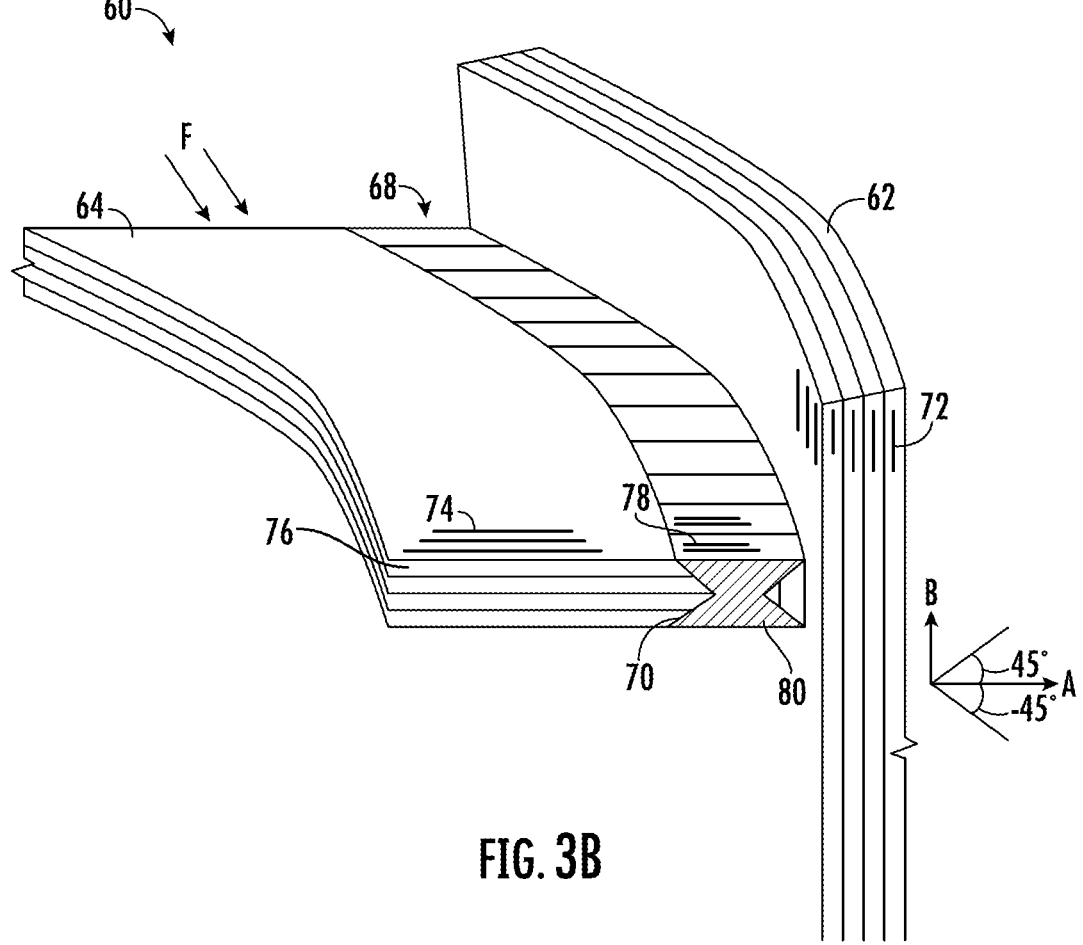

Alternatively, as shown in FIG. 3B, the joining plies 70 may be placed between the airfoil 62 and the band 64, and the composite plies 76 are adjacent to the joining plies 70. Such a configuration may result when the nozzle 60 is machined after curing the joining plies 70 to the repair area 68.

Figure 4:
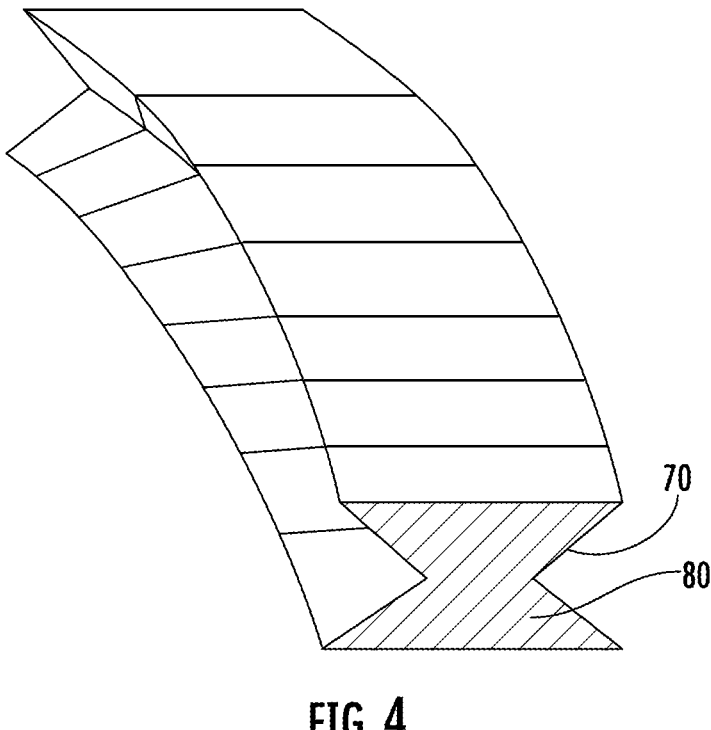
FIG. 4 is a perspective view of a ply stack applied to the repair area.

Now referring to FIG. 4, a ply stack of joining plies 70 is shown. To repair the nozzle 60, joining plies 70 are first placed onto composite plies 76 of the repair area 68. The joining plies 70 may be folded or arranged into a ply stack before being placed on the repair area 68. A "ply stack" is a set of the joining plies 70 that are placed or folded on each other prior to applying to the repair area 68. The ply stack may be easier or faster to place on the repair area 68 than individual joining plies 70. By way of example, the ply stack can be slipped into an opening or gap within the repair area 68. By way of further example such gaps can be variable in size or direction or include a blind aperture. The ply stack forms a spine that absorbs mechanical loads from the airfoil 62 and the band 64, improving interlaminar interaction and creating additional retention mechanisms to improve the strength of the nozzle 60. The joining plies 70 of the ply stack may be slanted upon shrinkage into the repair area 68, accommodating post build machining and thickness changes from curing the joining plies 70. Such slanting reduces defects such as voids that may occur during shrinkage.

Figure 5B:
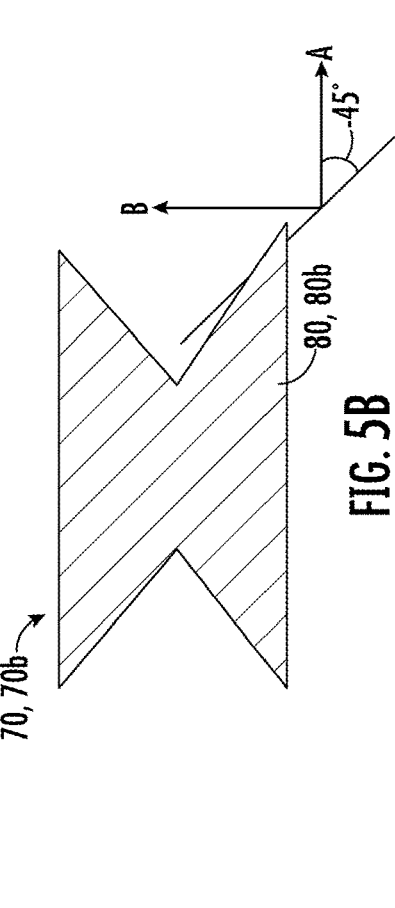
FIGS. 5A-5C are cross-sectional views of joining plies of the ply stack.
Figure 5A:
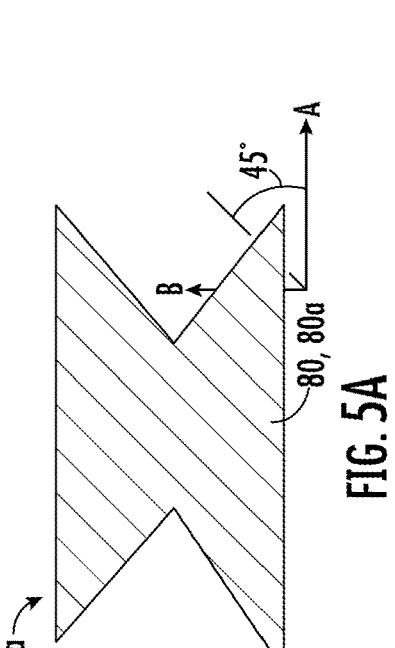
Figure 5C:
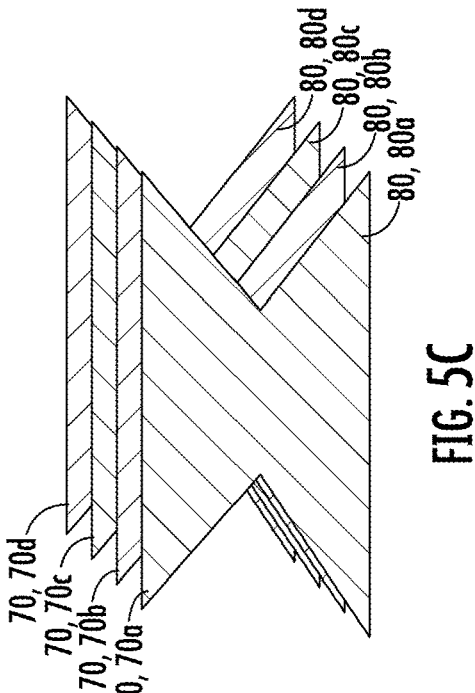

Referring particularly to FIGS. 5A, 5B, and 5C, the fiber direction 80 of some of the joining plies 70 may differ from the fiber direction 80 of others of the joining plies 70. That is, the joining plies 70 may include a first joining ply 70a and a second joining ply 70b placed on the first joining ply 70a such that a first fiber direction 80a of the first joining ply 70a differs from a second fiber direction 80b of the second joining ply 70b, forming a criss-cross pattern. In one exemplary embodiment, the first joining ply 70a may be a ply such as is shown in FIG. 5A, having a fiber direction 80a of 45 degrees, and the second joining ply 70n may be a ply such as is shown in FIG. 5B, having a fiber direction 80b of –45 degrees. The second fiber direction 80b may differ from the first fiber direction 80a by at least 60 degrees and up to 120 degrees. For the purposes of clarity in this disclosure, joining plies as shown in FIGS. 5A-5C are generally referred with the numeral "70" and a fiber direction "80," and letters are used to indicate specific ones of the joining plies 70 with specific fiber directions 80.

As shown in FIG. 5C, the joining plies 70 may further include a third joining ply 70c placed on the second joining ply 70b, the third joining ply 70c defining a third fiber direction 80c equal to the first fiber direction 80a, and a fourth joining ply 70d placed on the third joining ply 70c, the fourth joining ply 70d defining a fourth fiber direction 80d equal the second fiber direction 80b. Adjacent joining plies 70 thus may have differing fiber directions 80, which further dissipates loads and inhibits damage to the nozzle 60.

In addition to being off-plane to the fiber direction 72 of the airfoil 62, the fiber direction 80 of the joining plies 70 may be off-plane to a flow direction of the flowpath F (see FIG. 3) defined by the airfoil 62. The flowpath F is normal to the plane defined by the A and B axes in which the fiber directions 72, 74, 80 are defined, and the fiber direction 80 of the joining plies 70 would be off-plane because a nonzero angle is defined between the fiber direction 80 and the flow direction of the flowpath F that is normal to the A-B plane.

When the fiber direction 80 of the joining plies 70 is off-plane to the fiber directions 72, 74 of the airfoil 62 or the band 64, delamination of the joining plies 70 during heating is inhibited, improving the fusing of the joining plies 70 to the airfoil 62 and the band 64. The off-plane fiber directions 80 also provide a secondary retention mechanism to assist in securing the joining plies 70 to the repair area 68. As such, the repaired nozzle 60 may resist further damage from debris during operation.

Once all of the joining plies 70 have been placed, the nozzle 60 is heated to fuse the joining plies 70 to the repair area 68, forming an integral CMC component. By fusing the joining plies 70 to the repair area 68, mechanical loads received by the nozzle 60 are smoothly transferred between the airfoil 62 and the band 64. In particular, the joining plies 70 may form a spine that absorbs at least part of the mechanical loads, inhibiting crack formation and forming secondary retention mechanisms.

The nozzle 60 may be heated using a heating process such as melt infiltration, chemical vapor infiltration, brazing, sintering, or the like. For example, in a melt infiltration process, silicon or a silicon alloy is typically applied externally to the porous preform and melted, and the molten silicon or silicon alloy infiltrates into the porosity of the preform. A portion of the molten silicon is reacted with elemental carbon present in the porous preform, such as the carbon black originally present in the slurry as a precursor, or any carbon char formed by pyrolysis of organic binders. The molten silicon and carbon black react to form additional silicon carbide that fills the porosity to yield a final form of the nozzle 60.

As another example, in a chemical vapor infiltration process, a preform is heated in a vacuum or an inert atmosphere to decompose organic binders, forming a ceramic char and a porous layer. Then, a gaseous source of silicon, such as silicon carbide, is provided externally as a chemical vapor to infiltrate the porous layer. Upon infiltration, the chemical vapor reacts with the internal surfaces of the porous layer to deposit silicon carbide therein.

Because the joining plies 70 may shrink during the heating process, the fiber directions 80 may change from original fiber directions 80 when the joining plies 70 were placed. The joining plies 70 may be arranged with additional material to accommodate this shrinking during the heating process such that the fiber direction 80 remain substantially the same after the heating process. In particular, the joining plies 70 may be arranged such that, when the joining plies 70 shrink, the joining plies 70 shrink in a specified direction to form a contour surface of the nozzle 60 that is directed along the flowpath F.

In addition to repairing the CMC component, parts of the CMC component may be joined together with the joining plies 70. To perform a joining, in which an entire airfoil 62 is replaced or joined, a new solidified airfoil 62 may be joined to an already solidified band 64 at a specified joining area with the joining plies 70 described above. The joining area may be strategically placed to allow for function of the integral CMC component upon completion of the joining.

Figure 6:
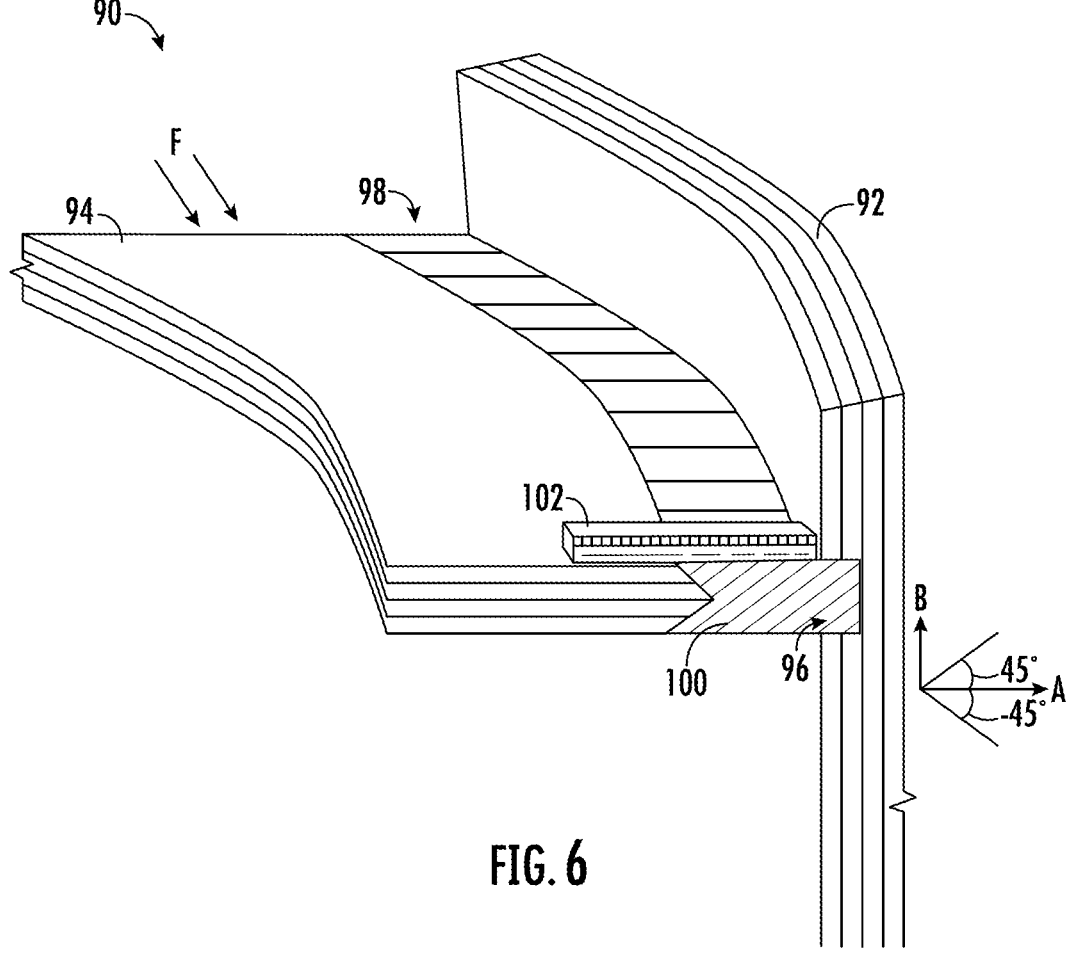
FIG. 6 is a magnified view of another nozzle.

Now referring to FIG. 6, another CMC component 90 is shown. Specifically, the CMC component 90 is a nozzle with an airfoil 92 and a band 94, and the airfoil 92 defines a cavity 96. In this exemplary embodiment, a repair area 98 extends from the airfoil 92 to the band 94, including the cavity 96. Because the cavity 96 is defined in the interior of the nozzle, joining plies 100 are inserted within to the cavity 96 such that the joining plies 100 extend into the cavity 96. Then, upon heating the nozzle, the joining plies 100 fuse with the airfoil 92, filling the cavity 96 and forming a unitary structure to form the nozzle. Because the cavity 96 may be hidden by portions of the airfoil 92 (i.e., the cavity 96 is a blind cavity), arranging the joining plies 100 such that some of the joining plies 100 are inserted into the cavity 96 improves repair or making of the CMC component 90.

In addition to repairing the CMC component 90, the joining plies 100 can provide additional structure to the airfoil 92 or the band 94. More specifically, some of the joining plies 100 in a ply stack can form a spine that, upon fusing to the repair area 98, forms an extension 102 extending out from the repair area 98. This extension 102 can absorb energy from loads and debris impacts, thereby acting as a stiffening rib. The joining plies 100 that form the extension 102 may have fiber directions that differ from the fiber directions of the joining plies 100 in the remainder of the ply stack. As an example, the extension 102 may include joining plies 100 having fiber directions of 0 degrees, 90 degrees, or combinations thereof, and the other joining plies 100 may have fiber directions of 45 degrees, −45 degrees, or combinations thereof. That is, the joining plies 100 and the extension 102 may form a −45/45/0/90 ply stack.

Figure 7:
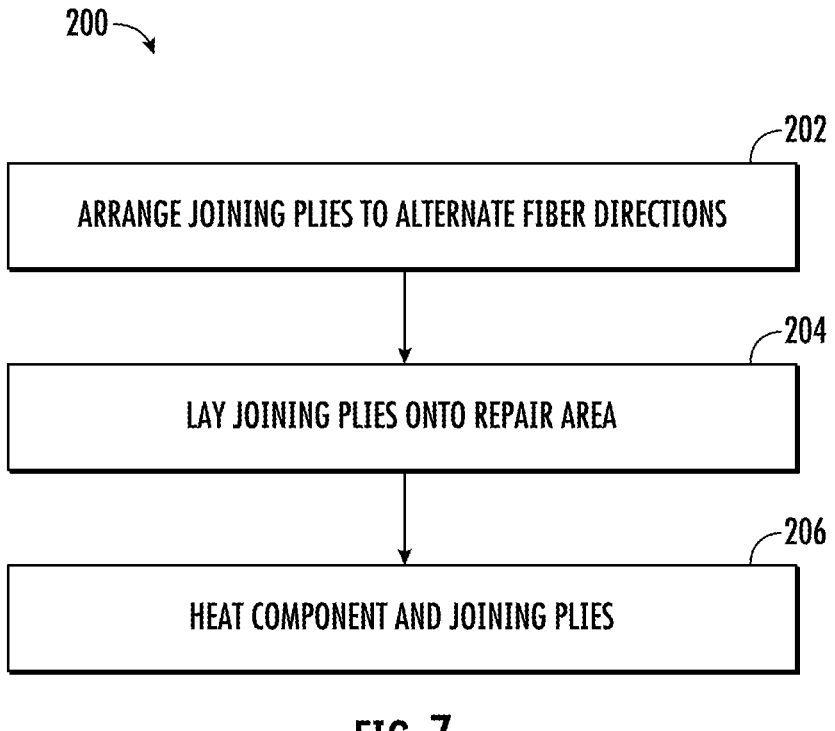
FIG. 7 is a block diagram of a method for repairing a CMC component such as the nozzle of FIG. 2.

Referring now to FIG. 7, a flow diagram of a method 200 of forming a CMC component in accordance with an exemplary aspect of the present disclosure is provided. The method 200 of FIG. 7 may be utilized to repair or make one or more of the CMC components described above with reference to FIGS. 1 through 5. Accordingly, it will be appreciated that the method 200 may generally be utilized to repair CMC components for a gas turbine engine 10 as described above. However, in other exemplary aspects, the method 200 may additionally or alternatively be utilized to form any other suitable CMC component including a new make component.

As is depicted, the method 200 includes at (202) arranging joining plies in a ply stack such that the fiber directions of adjacent joining plies differ. More specifically, as shown in FIG. 5C, the joining plies may be arranged such that fiber directions alternate between two specified fiber directions, such as the 45 degree and −45 degree fiber directions described above. It is appreciated that this step may be omitted when the joining plies are not arranged in a ply stack.

The method 200 includes at (204) placing the joining plies on a repair area of the CMC component. Placing can include, by way of non-limiting example, that the joining plies are placed either as a ply stack or individually onto the repair area. The joining plies are placed such that the fiber direction of the joining plies is off-plane to the fiber direction of the composite plies of the repair area. As an example, the joining plies may have fiber directions of 45 and −45 degrees, which may be off-plane to plies of an airfoil having a fiber direction of 0 degrees and off-plane to plies of a band having a fiber direction of 90 degrees. In an exemplary embodiment, the joining plies extend into a cavity formed in the CMC component. Placing, by way of further non-limiting example, can include inserting the ply stack into a gap, aperture, blind opening or repair area. This further includes that the ply stack can be slid or barrel-loaded into such gap, aperture, blind opening, or repair area.

The method 200 includes at (206) heating the CMC component and the joining plies to fuse the joining plies to the repair area. The heating may be a melt infiltration process, a chemical vapor infiltration process, a brazing process, or any other suitable heating process. During the heating, the joining plies fuse with the repair area, becoming a repaired portion of the CMC component. In an exemplary embodiment, the joining plies form an extension that, upon fusing to the repair area, becomes a stiffening rib to improve strength of the CMC component.

The disclosed methods allow for repair or new make of CMC components, such as nozzles, airfoils, and bands, in a manner that allows for CMC infiltration on a repair area, a CMC braze in the repair area, or CMC green state joining that allows for further repair operations. By including different fiber directions for certain plies in the repair area relative to fiber directions of plies in an adjacent portion of the component delamination is reduced or inhibited, improving mechanical strength of the CMC component.

Further aspects are provided by the subject matter of the following clauses:

A method for joining a ceramic matrix composite (CMC) component includes placing a plurality of joining plies onto a repair area, each of the plurality of joining plies having a fiber direction off-plane to a fiber direction of one or more composite plies of the repair area and forming an integral component by bonding the plurality of joining plies to the repair area.

The method of any of the previous clauses, wherein the fiber direction of the plurality of joining plies differs from the fiber direction of the one or more composite plies by at least 40 degrees and up to 140 degrees.

The method of any of the previous clauses, wherein the plurality of joining plies include a first joining ply and a second joining ply placed on the first joining ply, wherein a first fiber direction of the first joining ply differs from a second fiber direction of the second joining ply.

The method of any of the previous clauses, wherein the plurality of joining plies include a third joining ply placed on the second joining ply, the third joining ply defining a third fiber direction equal to the first fiber direction.

The method of any of the previous clauses, wherein the plurality of joining plies include a fourth joining ply placed on the third joining ply, the fourth joining ply defining a fourth fiber direction equal the second fiber direction.

The method of any of the previous clauses, wherein the second fiber direction differs from the first fiber direction by at least 60 degrees and up to 120 degrees.

The method of any of the previous clauses, wherein the plurality of joining plies form a spine that, upon fusing to the repair area, forms an extension extending out from the repair area.

The method of any of the previous clauses, wherein heating the CMC component further comprises heating the CMC component in one of a melt infiltration process, a chemical vapor infiltration process, or a brazing process.

The method of any of the previous clauses, further including folding the plurality of joining plies into a folded ply stack and placing the folded ply stack onto the repair area.

The method of any of the previous clauses, wherein the repair area includes a cavity defined in an interior of the CMC component, and wherein the method further includes placing the plurality of joining plies in the repair area such that the joining plies extend into the cavity.

The method of any of the previous clauses, wherein the bonding comprises an infiltration process to form a bond between the plurality of joining plies and the repair area.

The method of any of the previous clauses, wherein the plurality of joining plies join a first part to a second part.

The method of any of the previous clauses, wherein the one or more composite plies of the repair area each have a fiber direction of 90 degrees, the first part includes another plurality of composite plies each having a fiber direction of 90 degrees, the second part includes a plurality of composite plies each having a fiber direction of 0 degrees, and each of the plurality of joining plies has a fiber direction different than 0 degrees or 90 degrees.

The method of any of the previous clauses, wherein the one or more composite plies of the repair area each have a fiber direction of 90 degrees, the first part includes another plurality of composite plies having fiber directions alternating between 0 degrees and 90 degrees, and wherein the plurality of joining plies have fiber directions alternating between −45 degrees and 45 degrees.

A method for joining a ceramic matrix composite (CMC) component includes placing a plurality of joining plies onto a specified area such that a respective fiber direction of each of the plurality of joining plies is off-plane to a fiber direction of one or more composite plies of the specified area, wherein the respective fiber direction of each of the plurality of joining plies differs from the respective fiber direction of each adjacent one of the plurality of joining plies.

The method of any of the previous clauses, wherein the respective fiber direction of each of the plurality of joining plies differs from the respective fiber direction of each adjacent one of the plurality of joining plies by at least 60 degrees and up to 120 degrees.

The method of any of the previous clauses, wherein placing the plurality of joining plies onto the specified area further comprises placing a first joining ply in a first fiber direction and placing a second joining ply on the first joining ply in a second fiber direction, the second fiber direction differing from the first fiber direction by at least 60 degrees and up to 120 degrees.

The method of any of the previous clauses, further including placing a third joining ply on the second joining ply in the first fiber direction and, then, placing a fourth joining ply on the third joining ply in the second fiber direction.

The method of any of the previous clauses, wherein the fiber direction of at least one of the plurality of joining plies differs from the fiber direction of the one or more composite plies of the specified area by at least 40 degrees and up to 140 degrees.

The method of any of the previous clauses further including heating the CMC component in one of a melt infiltration process, chemical vapor infiltration, or a brazing process.

A method for joining a ceramic matrix composite (CMC) component includes placing a plurality of joining plies onto a specified area such that a respective fiber direction of each of the plurality of joining plies is nonparallel to a fiber direction of one or more composite plies of the specified area and forming an integral component by bonding the plurality of joining plies to the specified area of the CMC component.

The method of any of the previous clauses, wherein the respective fiber direction of each of the plurality of joining plies differs from the respective fiber direction of each adjacent one of the plurality of joining plies.

The method of any of the previous clauses, wherein the specified area is a repair area and the integral component formed by the bonding is a repaired CMC component.

A method for joining a ceramic matrix composite (CMC) component includes placing a ply stack defined by a plurality of joining plies onto a specified area of the CMC component such that a respective fiber direction of each of the plurality of joining plies is off-plane to a fiber direction of one or more composite plies of the specified area of the CMC component.

The method of any of the previous clauses, wherein the respective fiber direction of each of the plurality of joining plies differs from the respective fiber direction of each adjacent of the one or more composite plies of the specified area of the CMC component.

The method of any of the previous clauses, further including forming an integral component by bonding the plurality of joining plies to the specified area of the CMC component.

The method of any of the previous clauses, wherein the specified area is a repair area and the integral component formed by the bonding is a repaired CMC component.

The method of any of the previous clauses, wherein the specified area of the CMC component includes a cavity and placing the ply stack comprises inserting the ply stack into at least a portion of the cavity.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

I claim:

1. A method for joining a ceramic matrix composite (CMC) component, the method comprising:
   placing a plurality of joining plies into a repair area, the repair area defining an interface between a first part of the CMC component and a second part of the CMC component, the first part comprising a first plurality of composite plies stacked in a first stacking direction adjacent the interface, and the second part comprising a second plurality of composite plies stacked in a second stacking direction adjacent the interface, wherein the first stacking direction and the second stacking direction are different, each of the plurality of joining plies being stacked in a third stacking direction at the interface that is different from the first and second stacking directions planes; and
   forming an integral component by bonding the plurality of joining plies to the repair area.

2. The method of claim 1, wherein the third stacking direction differs from the first and second stacking directions by at least 40 degrees and up to 140 degrees.

3. The method of claim 1, wherein the plurality of joining plies include a first joining ply and a second joining ply placed on the first joining ply, wherein a first fiber direction of the first joining ply differs from a second fiber direction of the second joining ply.

4. The method of claim 3, wherein the plurality of joining plies include a third joining ply placed on the second joining ply, the third joining ply defining a third fiber direction equal to the first fiber direction.

5. The method of claim 4, wherein the plurality of joining plies include a fourth joining ply placed on the third joining ply, the fourth joining ply defining a fourth fiber direction equal the second fiber direction.

6. The method of claim 3, wherein the second fiber direction differs from the first fiber direction by at least 60 degrees and up to 120 degrees.

7. The method of claim 1, wherein the plurality of joining plies form a spine that, upon fusing to the one or more composite plies of the repair area, forms an extension extending out from the repair area.

8. The method of claim 1, wherein forming the integral component comprises heating the CMC component in one of a melt infiltration process, a chemical vapor infiltration process, or a brazing process.

9. The method of claim 1, further comprising:
   folding the plurality of joining plies into a folded ply stack; and
   inserting the folded ply stack into the repair area.

10. The method of claim 1, wherein the repair area includes a cavity defined in an interior of the CMC component, and wherein the method further comprises:
   placing the plurality of joining plies in the repair area such that the plurality of joining plies extend into the cavity.

11. The method of claim 1, wherein the bonding comprises an infiltration process to form a bond between the plurality of joining plies and the repair area.

12. The method of claim 1, wherein the plurality of joining plies join the first part of the CMC component to the second part of the CMC component.

13. The method of claim 12, wherein the first stacking direction extends in a first direction at 90 degrees with respect to a coordinate system, the second stacking direction extends in a second direction at 0 degrees with respect to the coordinate system, and the third stacking direction is different than 0 degrees or 90 degrees with respect to the coordinate system.

14. The method of claim 12, wherein the plurality of joining plies have fiber directions alternating between-45 degrees and 45 degrees within the third stacking direction.

15. A method for joining a ceramic matrix composite (CMC) component, the method comprising:

placing a ply stack defined by a plurality of joining plies into a specified area defining an interface between a first part of the CMC component and a second part of the CMC component, wherein the first part comprises a first plurality of composite plies stacked in a first stacking direction adjacent the interface, and the second part comprising a second plurality of composite plies stacked in a second stacking direction adjacent the interface, wherein the first stacking direction and the second stacking direction are different, and wherein each of the plurality of joining plies is stacked in a third stacking direction different from the first and second stacking directions.

16. The method of claim 15, further comprising folding the plurality of joining plies into a folded ply stack and inserting the folded ply stack onto the specified area.

17. The method of claim 15, wherein the plurality of joining plies comprises a first joining ply placed on a second joining ply, and wherein a first fiber direction of the first joining ply differs from a second fiber direction of the second joining ply by at least 60 degrees and up to 120 degrees.

18. The method of claim 15, further comprising forming an integral component by bonding the plurality of joining plies to the specified area of the CMC component.

19. The method of claim 18, wherein the specified area is a repair area and the integral component formed by the bonding is a repaired CMC component.

20. The method of claim 15, wherein the specified area of the CMC component includes a cavity and placing the ply stack comprises inserting the ply stack into at least a portion of the cavity.

* * * * *